March 22, 1927.                         1,621,774
H. D. FITZGERALD
THERMOSTATIC TRAP
Filed Nov. 6, 1925
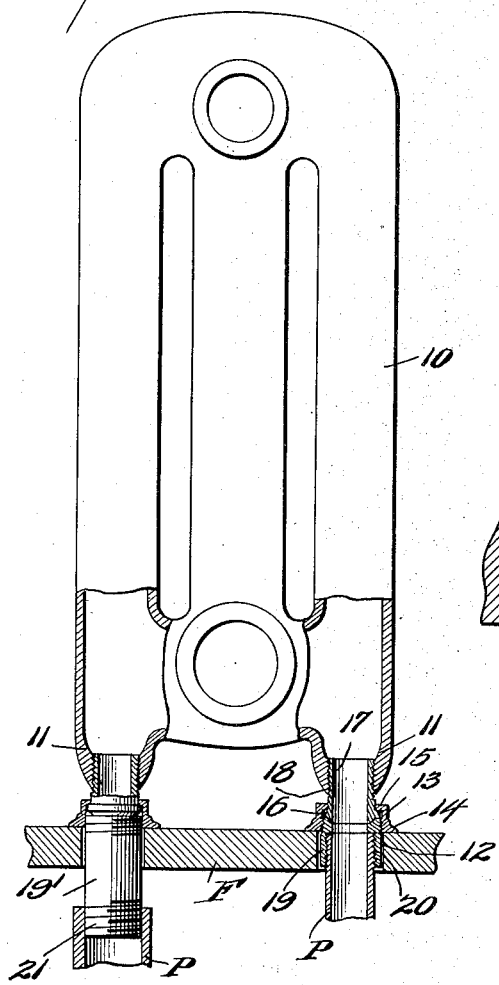
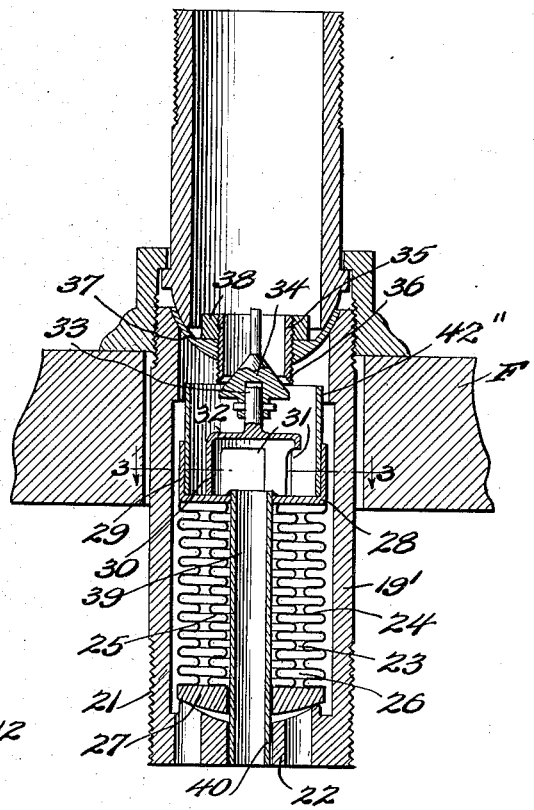
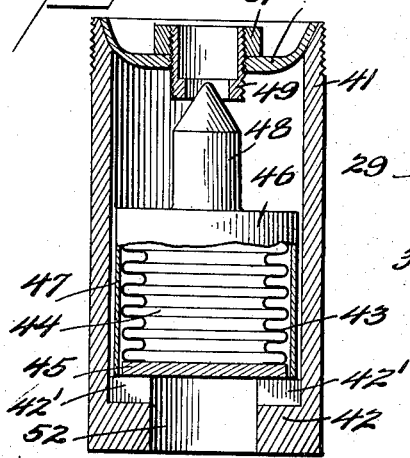
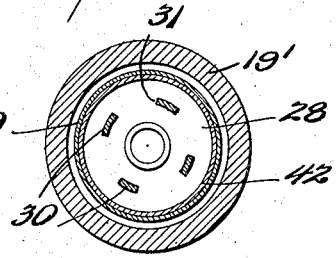
Inventor
H. D. Fitzgerald
By Cushman Bryant & Darby
Attorneys Patented Mar. 22, 1927.

1,621,774

UNITED STATES PATENT OFFICE.

HAROLD D. FITZGERALD, OF DANVILLE, VIRGINIA.

THERMOSTATIC TRAP.

Application filed November 6, 1925. Serial No. 67,368.

The present invention relates to heating apparatus, in which a thermostatic trap is provided for regulating the flow of steam, and has, as an object, the provision of a trap of improved construction, and means for conveniently installing the same in a readily accessible position.

Further objects of the invention are to provide means permitting convenient inspection and repair of the trap and replacement of its parts, particularly the valve seat; to provide a trap which may be located within a hollow supporting leg for a radiator; to provide means for directing the condensate or fluid through the system without bringing the same into direct contact with the thermostatic element, which is preferably an expansible bellows, and, generally, to afford a construction which is pleasing in appearance, and may be cheaply manufactured, and conveniently installed.

Other objects of the invention will become more apparent as the description proceeds in connection with an embodiment shown in the accompanying drawings, wherein:—

Figure 1 is an elevational view of a radiator section with a portion broken away to show the construction of the supporting leg which houses the trap.

Figure 2 is a vertical sectional view taken through the leg.

Figure 3 is a horizontal section on the line 3—3 of Figure 1, and

Figure 4 is a vertical sectional view of a modified construction.

Referring to the drawings for a more detailed description, 10 indicates a radiator section having, adjacent its bottom, openings 11 which serve for connecting to the section hollow supporting legs which are adapted to engage the floor F, or other support for the radiator, and to cover the pipe openings 12 therein. The present invention does not relate to the construction of the leg, since the same is shown and claimed in my copending applications, Serial No. 643,038, filed June 2, 1923, and Serial No. 656,839, filed August 11, 1923, the latter application showing a radiator leg of substantially the exact construction shown herein. Each leg comprises a collar 13 having a flange 14 adapted to engage the floor, or other support, around the opening 12, and to cover the opening. The collar has an inwardly extending flange 15 which overlies a flange 16 upon a leg section 17, provided with suitable means, such as threading 18 for connecting the leg to the radiator section 10. A second leg section 19 is threaded within the collar, and is provided with a suitable threading 20 for connecting the leg with a pipe line P.

Referring to Figures 1 and 2, it will be noted that one of the legs has a section 19', which is slightly longer than the corresponding section 19 of the other leg, and, at its lower end, is externally threaded, as at 21, to fit within the pipe line, instead of outside the latter, as in the case of the other leg shown in Figure 1. This modification of the leg section is made for the purpose of adapting the leg section to serve as a housing for a thermostatic trap. At its lower end the section may be formed with a perforated wall 22, or other inwardly extending means, adapted to support a thermostatic element 23, which, preferably, is in the form of a bellows having spaced walls 24, 25, which form a chamber 26 therebetween. The chamber 26, which serves to receive the ether, or other expansible fluid, is closed at its ends, as by connecting the bellows walls to a bottom plate 27 and a top plate 28, and the latter is provided with an upstanding flange 29, which surrounds a central dome or cap 30, the latter being provided, in its side walls, with openings 31, and its top wall 32 carrying a stud or pin 33, to which a valve 34 is connected. The valve 34 cooperates with a thimble 35, the lower end of which is beveled to form a seat 36. The thimble is threaded through an opening in a substantially dishshaped carrying member 37, and may be locked in position by means of a shoulder 38 thereon serving as a stop to engage the carrying member, which is preferably clamped between the leg sections 17, 19', within the collar 13.

When the thermostatic element is contracted, and the valve 34 is out of engagement with its seat, steam condensate or fluid may pass through the openings 31, and a central passage 39 in the bellows, this passage having arranged therein a tube 40, which forms a lining for the passage, and excludes the fluid from contact with the interior wall 25. This is an important feature of the invention, since it is highly desirable that the condensate pass through the housing or leg section 19', without contacting with the bellows, since the thermostatic element quickly deteriorates when subjected to the action of water. The flange 20 below the valve 36 serves to direct the fluid through the openings 31, and, if desired, this flange may be heightened or a separate sleeve 42″ provided, the sleeve extending upwardly around the valve seat, so as to effectively direct the water downwardly through the central passage 39 and prevent it from dripping over the outer wall 24 of the bellows.

It will be noted that the valve seat may be quickly detached for cleaning or replacement by simply disconnecting the leg sections 17, 19′, through the collar 13, and swinging the radiator to move the leg sections out of vertical alignment. Due to the fact that the entire trap, including the valve seat, is positioned entirely within one section, in the present instance the section 19′, the radiator may be swung readily to move the leg sections out of alignment when they are disconnected, without raising the radiator. When this is done, either the valve seat or the entire trap may be removed and inspected. The construction described enables a radiator leg, such as shown in my co-pending applications, to be adapted to radiators as standard parts thereof, and the trap may be readily installed in any leg by replacing one of the sections, such as the section 19, with a trap housing section 19′. Moreover, the entire trap, including the thermostatic element, is housed within the leg in vertical position, and the condensate may be discharged without coming into contact with the bellows.

In Figure 4, there is shown a modified trap construction, which directs the fluid around the bellows or heat responsive element, instead of through the same. Referring to Figure 4, there is shown a leg section 41 corresponding to the leg section 19′ of Figures 1 and 2, and open at each end. The lower end has an inwardly projecting flange 42, which serves to support a heat responsive element in the form of a bellows 43 forming a chamber 44 closed at one end by the disk 45, and, above, by the closed end of a valve carrying cup 46. The cup 46 has a depending side wall or skirt 47 spaced from the bellows and surrounding the latter. The valve 48 projects upwardly from the closed upper end of the cup to co-operate with a seat 49 in the form of an externally threaded ferrule centrally positioned in a dished carrying disk 50, and locked against movement by means of a collar 51. The cup 46 is formed as a unit with the valve 48 and bellows 43, and, as the bellows expands, under heat, the cup moves vertically with the valve 48. The bellows rest upon the inturned flange 42, which has cut-away portions 42′ to receive fluid and direct it through the outlet opening 52 at the lower end of the leg section. It will be noted that the bellows housing wall 47 is spaced from the wall of the leg section, so that fluid passing through the valve seat 49 may flow freely around the heat responsive element out of contact with the bellows and through the discharge opening 52. The bellows is centered by the pointed end of the valve 48 normally projecting into its seat, and thereby preventing displacement of the heat responsive unit. This construction is simpler than that illustrated in Figure 2, but, as will be understood, it embodies the same principle and the advantages. The entire trap, including the seat and heat responsive element, is positioned entirely within a leg section, and it will be noted that the valve seat does not project beyond the upper end of the section, whereby the bellows may be swung laterally when the leg sections are disconnected without raising the radiator to any substantial extent.

It will be understood, of course, that numerous modifications may be made in the construction described without departing from the invention, which is defined in the following claims.

I claim:—

1. A hollow supporting leg forming a fluid passage and comprising a collar having a circumferential flange adapted to engage the surface of a floor or other support around a pipe opening, and to cover the opening, a relatively short leg section fitting within said collar and having means for attachment to a radiator section, and a second relatively short leg section having means for attachment to said collar and adapted to make a substantially fluid tight joint with said first mentioned section within the collar, said leg having means for supporting a thermostatic trap adapted to control the travel of fluid through said leg.

2. A hollow supporting leg forming a fluid passage and comprising a collar having a circumferential flange adapted to engage the surface of a floor or other support around a pipe opening and to cover the opening, a relatively short leg section fitting within said collar and having means for attachment to a radiator section, and a second relatively short leg section having means for attachment to said collar and adapted to make a substantially fluid tight joint with said first mentioned section within the collar, one of said sections having means for retaining a thermostatic trap and permitting its free removal when said leg sections are separated.

3. A hollow supporting leg forming a fluid passage and comprising a collar having a circumferential flange adapted to engage the surface of a floor or other support around a pipe opening and to cover the opening, a relatively short leg section fitting within said collar and having means for attachment to a radiator section, and a second relatively short leg section having means for attachment to said collar and adapted to make a substantially fluid tight joint with said first mentioned section within the collar, one of said sections having therein a thermostatic trap including a valve seat clamped between said sections, said trap serving to control the travel of fluid through said leg.

4. A hollow supporting leg forming a fluid passage and comprising a collar having a circumferential flange adapted to engage the surface of a floor or other support around a pipe opening and to cover the opening, a relatively short leg section fitting within said collar and having means for attachment to a radiator section, and a second relatively short leg section having means for attachment to said collar and adapted to make a substantially fluid tight joint with said first mentioned section within the collar, one of said sections having therein a thermostatic trap including a valve seat removably positioned between said sections, said trap serving to control the travel of fluid through said leg.

5. A hollow supporting leg forming a fluid passage and comprising a collar having a circumferential flange adapted to engage the surface of a floor or other support around a pipe opening and to cover the opening, a relatively short leg section fitting within said collar and having means for attachment to a radiator section, and a second relatively short leg section having means for attachment to said collar and adapted to make a substantially fluid tight joint with said first mentioned section within the collar, one of said sections having therein a thermostatic trap including a valve seat clamped between said sections, said collar serving to tighten the joint between said sections and to clamp said valve seat in position, and the trap being adapted to control the travel of fluid through said leg.

6. A hollow supporting leg forming a fluid passage and comprising a circumferential flange adapted to engage the surface of a floor or other support around a pipe opening and to cover the opening, means for connecting the leg to a pipe through said opening, means for connecting the leg to a radiator section, said leg having means for supporting a thermally controlled trap therein.

7. A hollow supporting leg forming a fluid passage and comprising a circumferential flange adapted to engage the surface of a floor or other support around a pipe opening and to cover the opening, means for connecting the leg to a pipe through said opening, means for connecting the leg to a radiator section and a thermally controlled trap in said leg serving to control the travel of fluid therethrough, said trap including a heat responsive element housed within one of said leg sections, a valve actuated by said element, a seat for said valve, and means permitting passage of fluid through the interior of said leg without contacting with said heat responsive element.

8. A hollow radiator supporting leg forming a fluid passage and having means adapted to support and house therein a thermally controlled trap serving to control the passage of fluid through said leg.

9. A hollow radiator supporting leg forming a fluid passage and having housed therein a thermally controlled trap serving to control the travel of fluid through said leg, said trap comprising a heat expansible bellows, a valve actuated by said bellows, and means for directing fluid through said leg without bringing the same directly in contact with the bellows.

10. A hollow supporting leg forming a fluid passage and comprising a section having a circumferential flange adapted to engage the surface of a floor or other support around a pipe opening and to cover the opening, and having means for attachment to a radiator section, and a second relatively short leg section and adapted to make a substantially fluid tight joint with said first mentioned section, one of said sections having therein a thermostatic trap including a heat responsive element, a valve seat, and a valve element operable thereby, all positioned entirely within said section, said thermostatic trap serving to control the passage of fluid through said leg.

11. A hollow supporting leg forming a fluid passage and comprising a section having a circumferential flange adapted to engage the surface of a floor or other support around a pipe opening and to cover the opening, and having means for attachment to a radiator section, and a second leg section having therein a thermostatic trap serving to control the passage of fluid through said leg and including a heat responsive element, a valve operated thereby, and a valve seat, all of which are positioned below the upper end of said section.

12. A hollow supporting leg forming a fluid passage and comprising a section having a circumferential flange adapted to engage the surface of a floor or other support around a pipe opening and to cover the opening, and having means for attachment to a radiator section, and a second leg section having therein a thermostatic trap serving to control the travel of fluid through said leg and including a heat responsive element, a valve operated thereby, and a valve seat, all of which are positioned below the upper end of said section, said valve seat being removable from said section.

13. A hollow supporting leg forming a fluid passage and comprising a section having a circumferential flange adapted to engage the surface of a floor or other support around a pipe opening and to cover the opening, and having means for attachment to a radiator section, and a second leg section having therein a thermostatic trap serving to control the passage of fluid through said leg and including a heat responsive element, a valve operated thereby, and a valve seat, all of which are positioned below the upper end of said section, said valve seat and heat responsive element being removable from said section.

14. A hollow supportng leg forming a fluid passage and having means adapted to engage the surface of a floor or other support around a pipe opening and to cover the opening and comprising two sections, one of which is adapted to be secured to a radiator, and the other to a pipe line, means for connecting said sections together, a thermostatic trap within said leg serving to control the travel of fluid through said leg and including a heat responsive element, a valve operated thereby, and a valve seat, said valve seat being secured between said sections and said trap being removably positioned within said leg.

15. A thermally controlled trap comprising a heat responsive element adapted to be positioned within a pipe line, a valve movable by said element, and an imperforate housing surrounding and serving to completely exclude fluid from the said element and formed therewith as a unit.

16. In a thermostatic trap, a heat expansible bellows adapted to be positioned within a pipe line, a valve member actuable for said bellows, and a housing for the bellows slightly spaced therefrom around the same and forming with the valve and bellows a unitary structure, said housing being imperforate and completely enclosing said bellows whereby to exclude fluid therefrom.

17. In a device of the class described, a heat expansible bellows, a valve member mounted upon and movable by said bellows, and a skirt extending from said valve member over the top of and downwardly around said bellows to form a housing therefor, said skirt completely enclosing the top and sides of said bellows whereby to exclude fluid therefrom.

18. In a device of the class described, a heat expansible bellows, a valve member mounted upon and movable by said bellows, a skirt extending from said valve member entirely over one end of and around the sides of said bellows to form a housing therefor, said skirt being spaced from the bellows around the same and being movable with said valve member, and an imperforate bottom member for said bellows closely fitting adjacent said skirt to cooperate therewith to exclude fluid from said bellows.

19. A hollow supporting leg comprising means adapted to engage the surface of a floor or other support around a pipe opening to cover the opening, means for connecting the leg to a radiator section and to a pipe line through said opening, and a thermally controlled trap in said leg comprising a heat responsive element, a valve movable by said element, and a housing for said element to prevent fluid from contacting with the same, said housing being spaced from the wall of said leg within the latter to permit fluid to pass freely around the heat responsive element.

20. A hollow supporting leg comprising means adapted to engage the surface of a floor or other support around a pipe opening and to cover the opening, means for connecting the leg to a radiator section and to a pipe line, and a thermally controlled trap positioned within said leg comprising a heat expansible bellows, a valve actuable by said bellows, and a housing surrounding the bellows to prevent fluid from contacting therewith, said housing and bellows being spaced from the wall of said leg section to permit fluid to freely pass through the leg section around the housing.

21. In a heating system, a pair of pipe sections detachably joined together, a valve seat removably secured between said sections, and a heat responsive element positioned within one section and carrying a valve for engagement with said seat, said heat responsive element consisting of a bellows, and a housing surrounding said bellows to prevent fluid from contacting therewith, said housing being spaced from the wall of said pipe section to permit fluid to pass freely around the housing through the section.

In testimony whereof I have hereunto set my hand.

HAROLD D. FITZGERALD.